(12) United States Patent
Yoon

(10) Patent No.: US 8,548,396 B2
(45) Date of Patent: Oct. 1, 2013

(54) ANTENNA ELEMENT AND COMMUNICATION APPARATUS

(75) Inventor: Sung-Hyuk Yoon, Nagano (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 12/984,131

(22) Filed: Jan. 4, 2011

(65) Prior Publication Data
US 2011/0189963 A1 Aug. 4, 2011

(30) Foreign Application Priority Data
Feb. 4, 2010 (JP) .................................. 2010-023421

(51) Int. Cl.
*H04B 1/38* (2006.01)
*H01Q 11/00* (2006.01)
*H01Q 1/36* (2006.01)

(52) U.S. Cl.
USPC ........... 455/90.2; 343/700; 343/843; 343/893

(58) Field of Classification Search
USPC ................ 455/552, 552.1, 553, 553.1, 562.1, 455/575.7; 343/700
See application file for complete search history.

(56) References Cited

U.S. PATENT DOCUMENTS

| 6,842,158 B2* | 1/2005 | Jo et al. .......................... 343/895 |
| 7,071,889 B2* | 7/2006 | McKinzie et al. ............. 343/756 |
| 7,136,022 B2 | 11/2006 | Sato et al. |
| 7,477,199 B2* | 1/2009 | Hotta et al. .................... 343/702 |
| 2007/0182655 A1* | 8/2007 | Lee et al. .................... 343/792.5 |

FOREIGN PATENT DOCUMENTS

| JP | 2006-196994 | 7/2006 |
| JP | 2008-177668 | 7/2008 |

* cited by examiner

*Primary Examiner* — Nay A Maung
*Assistant Examiner* — Maryam Soltanzadeh
(74) *Attorney, Agent, or Firm* — Oblon, Spivak, McClelland, Maier & Neustadt, L.L.P.

(57) ABSTRACT

An antenna element includes a feeding path unit connected to a feeding point, first and second antenna main body units, and first and second short-circuit path units. The first antenna main body unit has one end connected to the feeding path unit and the other end that is opened. The second antenna main body unit has one end connected to a connection point between the feeding path unit and the first antenna main body unit and the other end that is opened. The first short-circuit path unit contributes to a resonance to a radio signal in a predetermined first frequency band, and is formed between the connection point and a ground point. The second short-circuit path unit contributes to a resonance to a radio signal in a second frequency band higher than the first frequency band, and has a path length different from that of the first short-circuit path unit.

17 Claims, 14 Drawing Sheets

Structural example of antenna element of first embodiment

Structural example of antenna element of first embodiment

Outline of evaluation test

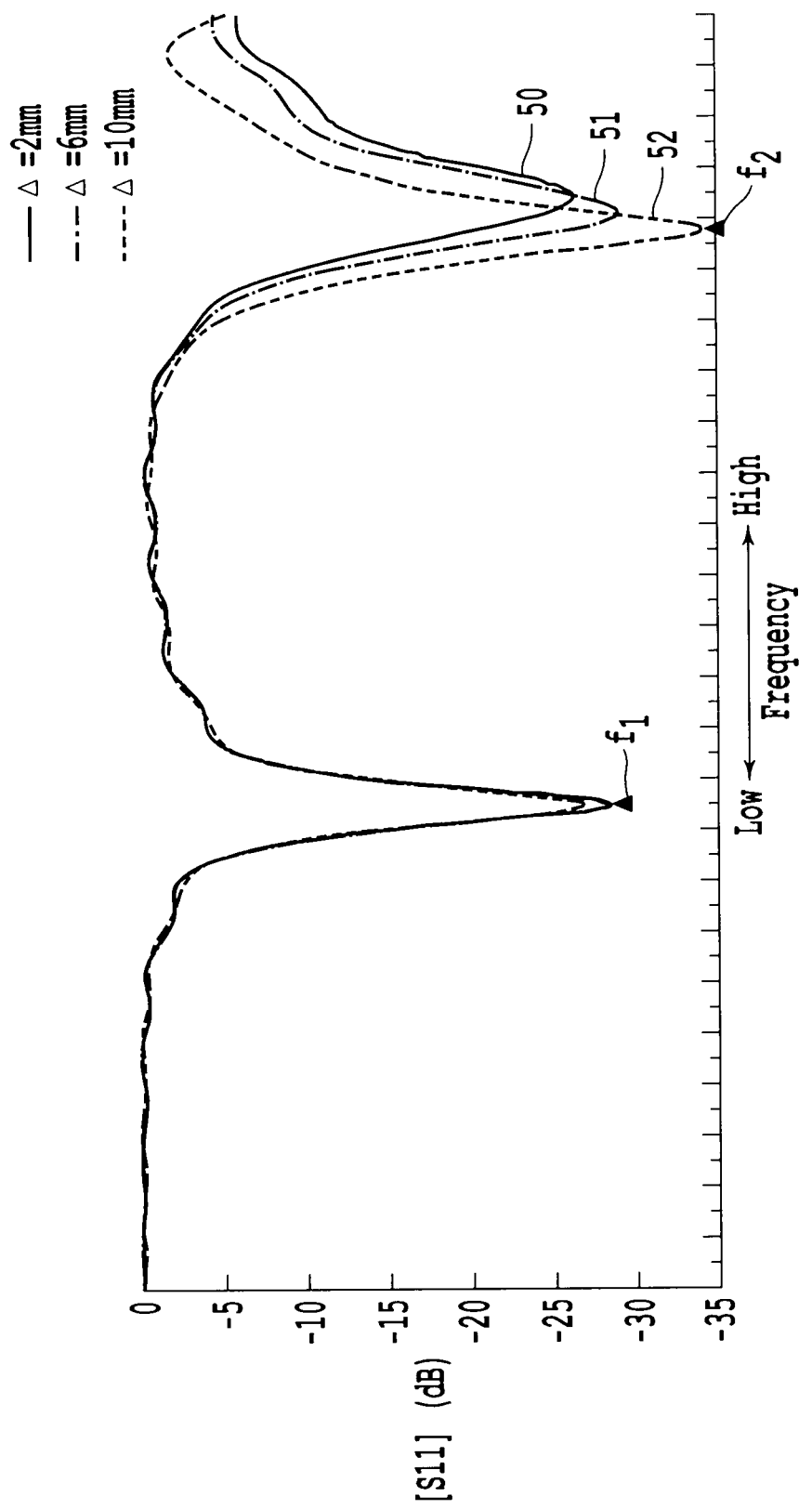

Relationship between low-band center frequency
and path length of first short circuit unit Relationship between S11 in low frequency band
and path length of first short circuit unit Structural example of antenna element
of comparative example 2

Structural example of antenna element
of comparative example 3

Frequency characteristic of antenna element of comparative example 2

Current path that contributes to resonance of signal in low-frequency band

Current path that contributes to resonance of signal in high-frequency band

Structural example of antenna element
of modified example

Structural example of antenna element in related art

Structural example of antenna element in related art

Structural example of antenna element in related art
(comparative example 1)

Structural example of antenna element in related art
(comparative example 1)

ANTENNA ELEMENT AND COMMUNICATION APPARATUS

BACKGROUND OF THE INVENTION

1. Field of the Invention

The present invention relates to an antenna element and a communication apparatus provided with the same, and more specifically, to an antenna element capable of being adapted to a plurality of frequency bands and a communication apparatus provided with the same.

2. Description of the Related Art

In related art, in a communication apparatus such as a mobile computer apparatus having a communication function and a mobile communication terminal, in order to respond to diversification of uses and functions thereof, various antenna elements have been proposed which are capable of being adapted to a plurality of frequency bands (see, for example, Japanese Patent Application Laid-open Nos. 2006-196994 and 2008-177668 (hereinafter, referred to as Patent Documents 1 and 2, respectively)).

FIG. 15 is a diagram showing the structure of an antenna element proposed in Patent Document 1. An antenna element 200 disclosed in Patent Document 1 is constituted of a first antenna element 201 of a folded monopole type and a second antenna element 202 of an end open type.

In the first antenna element 201 disclosed in Patent Document 1, the total length of an outward way from a feeding point 203 to a folded point and a return way from the folded point to a ground point 204 is set to a ½ wavelength of a first resonant frequency. Further, in the second antenna element 202, the length from the feeding point 203 to an open end via a branch point 205 is set to approximately ¼ wavelength of a second resonant frequency. Furthermore, in the antenna element 200 disclosed in Patent Document 1, the total length of the return way from the feeding point 203 to the ground point 204 via the branch point 205 and a short-circuit unit 206 is set to approximately ½ wavelength of the second resonant frequency, and the path portion is caused to function as a stab of the second antenna element.

In Patent Document 1, the antenna element 200 is configured as described above, thereby simplifying the shape of the antenna element 200 capable of causing multiple resonances and making an impedance adjustment, with the result that the antenna element is easily built in a radio apparatus.

FIG. 16 is a diagram showing the structure of an antenna element disclosed in Patent Document 2. An antenna element 210 disclosed in Patent document 2 is constituted of a feeding-side part element 211, a folded part element 212, and end open part element 213. The feeding part element 211 has a predetermined width d, and is formed to be extended from a feeding point 211a on a substrate 207 toward a first branch point 211b. The folded part element 212 branches from the feeding-side part element 211 at the first branch point 211b, is folded at the folded part 212a, and is thereafter grounded at a ground end 212b on the substrate 207. Further, the end open part element 213 branches from the feeding-side part element 211 at a second branch point 211c, and the end thereof is an open end 213a. Further, an outward way and a return way of the folded part element 212 are short-circuited at a short circuit point 212c on the way.

In Patent Document 2, the antenna element 210 is configured as described above, with the result that the multiple resonances of the antenna element and the reduction in size and height thereof are realized at the same time, and the independence of the impedance adjustment in different resonant frequencies is realized.

Further, as an antenna element capable of being adapted to a plurality of frequency bands, other than the antenna elements disclosed in Patent Documents 1 and 2, for example, an antenna element has been proposed which uses two inverted-F antennas in which a feeding unit and a short-circuit unit thereof are shared. FIG. 17 shows a structural example thereof. It should be noted that FIG. 17 shows the structure of an antenna element 220 capable of being adapted to two frequency bands.

The antenna element 220 shown in FIG. 17 is constituted of a dielectric portion 7, a low-frequency band antenna main body unit 1, a high-frequency band antenna main body unit 2, a feeding unit 3, and a short-circuit unit 224. The dielectric portion 7 is provided on a substrate 20. The low-frequency band antenna main body unit 1 contributes to a response to a radio signal in a low-frequency band. The high-frequency band antenna main body unit 2 contributes to a response to a radio signal in a high-frequency band.

The low-frequency band antenna main body unit 1 and the high-frequency band antenna main body unit 2 each are formed of a line path. Further, the low-frequency band antenna main body unit 1 and the high-frequency band antenna main body unit 2 are integrally formed on the dielectric portion 7. Specifically, one end portion of the low-frequency band antenna main body unit 1 in an extended direction and one end portion of the high-frequency band antenna main body unit 2 in an extended direction are connected to each other. It should be noted that another end portion 1a of the low-frequency band antenna main body unit 1 and another end portion 2a of the high-frequency band antenna main body unit 2 are open ends. In the antenna element 220 shown in FIG. 17, between the substrate 20 and a connection point 1b (hereinafter, referred to as branch point 1b) of the low-frequency band antenna main body unit 1 and the high-frequency band antenna main body unit 2, the feeding unit 3 and the short-circuit unit 224 are formed in parallel.

That is, the antenna element 220 shown in FIG. 17 has two open ends, one feeding point, and one ground point, unlike the antenna elements (each having one open end, one feeding point, and one ground point) disclosed in Patent Documents 1 and 2.

SUMMARY OF THE INVENTION

As described above, although the various antenna elements have been proposed which are capable of being adapted to a plurality of resonant frequency bands in related art, along with a recent reduction in size of an information processing terminal such as a mobile apparatus, an antenna element mounted thereon is also demanded to have a further reduced size, in addition to the multiple resonances and wider bandwidth. However, generally, if the antenna element is downsized, a frequency characteristic degrades, and a bandwidth is narrowed, so it is difficult to satisfy a desired specification.

In contrast, for example, the structure of the antenna element 220 shown in FIG. 17 is desirable to realize the reduction in height (reduction in size). However, the antenna element 220 described in FIG. 17 has the following problem.

In the antenna element 220 having the structure shown in FIG. 17, in the case where the thickness of the dielectric portion 7 and the extended lengths of the antenna main body portions are constant (predetermined), the adjustment of the frequency characteristics is made by adjusting the length of a path of the short-circuit unit 224 from the branch point 1b to the ground point 4a of the substrate 20.

FIG. 18 shows an outline of a specific adjustment method for the frequency characteristics in the antenna element 220 shown in FIG. 17. As shown in FIG. 18, in the antenna element 220 shown in FIG. 17, a distance between the feeding unit 3 and the folded part of the short-circuit unit 224 in an in-plane direction of the dielectric portion 7 is changed, thereby adjusting the length of the path of the short-circuit unit 224. It should be noted that FIG. 18 shows an example in which the folded part of the short-circuit unit 224 is set to be away from the feeding unit 3.

Here, FIG. 19 shows the change in the frequency characteristic at a time when the distance between the folded part of the short-circuit unit 224 and the feeding unit 3 is changed in the antenna element 220 shown in FIG. 17. It should be noted that, in FIG. 19, the horizontal axis of a graph indicates a frequency and a vertical axis thereof indicates an absolute value of an S parameter (S11: return loss) that represents a reflection amount of a signal at the feeding point 3a.

A characteristic 250 (solid line) shown in FIG. 19 is a frequency characteristic in the case where the distance between the feeding unit 3 and the folded part of the short-circuit unit 224 is increased by Δ=1 mm with the distance between the feeding unit 3 and the folded part of the short-circuit unit 224 in the antenna element 220 shown in FIG. 17 being set as a reference (Δ=0 mm). Further, a characteristic 251 (dashed and dotted line) and a characteristic 252 (broken line) are frequency characteristics in the case where the distance between the feeding unit 3 and the folded part of the short-circuit unit 224 is increased by 4=4 mm and 7 mm, respectively.

As shown in FIG. 19, when the distance between the short-circuit unit 224 and the feeding unit 3 is increased, the frequency characteristic in the high frequency band is improved (return loss |S11| is decreased), and a bandwidth at |S11|=−10 dB is increased. However, the increase in the distance between the short-circuit unit 224 and the feeding unit 3 causes the degradation (return loss |S11| is increased) of the frequency characteristic in the low frequency band, and the bandwidth at |S11|=−10 dB is also decreased.

In the structure of the antenna element 220 in related art as described above, if the frequency characteristic is optimized in one of the two frequency bands, there arises such a problem that the frequency characteristic in the other frequency band is deteriorated. That is, in the antenna element 220 shown in FIG. 17, it may be impossible to make an adjustment (impedance adjustment) on the frequency characteristics in the frequency bands independently of each other. It is difficult to obtain excellent frequency characteristics in both of the two frequency bands.

In view of the above-mentioned circumstances, it is desirable to provide an antenna element capable of being adapted to a plurality of frequency bands and a communication apparatus provided with the antenna element, which realize the reduction in height of the antenna element, allow the characteristics of the respective frequency bands to be adjusted independently, and obtain excellent characteristics in the plurality of frequency bands.

According to an embodiment of the present invention, there is provided an antenna element including a feeding path unit, a first antenna main body unit, a second antenna main body unit, a first short-circuit path unit, and a second short-circuit path unit. Those constituents have the following structures and functions. The feeding path unit is connected to a feeding point. The first antenna main body unit has one end, which is connected to the feeding path unit, and the other end, which is an open end. The second antenna main body unit has one end, which is connected to a connection point between the feeding path unit and the first antenna main body unit, and the other end, which is an open end. The first short-circuit path unit contributes to a resonance to a radio signal in a predetermined first frequency band, and the first short-circuit path unit is formed between the connection point and a ground point. The second short-circuit path unit contributes to a resonance to a radio signal in a second frequency band that is higher than the first frequency band. The second short-circuit path unit is formed between the connection point and the ground point and has a path length different from a path length of the first short-circuit path unit.

Further, according to another embodiment of the present invention, there is provided a communication apparatus including the antenna element according to the above embodiment and a communication circuit that modulates and demodulates the radio signal that is transmitted and received with the antenna element.

The antenna element according to the embodiment of the present invention is an antenna element in which a plurality of inverted-F antennas is integrated to be adapted to a plurality of frequency bands. In the antenna element, the feeding path unit is shared, and a short-circuit path unit that contributes to the resonance in each of the frequency bands is provided for each frequency band (for each inverted-F antenna).

The inventor of the present invention has conducted an examination test and found that the frequency characteristics in various frequency bands are capable of being independently adjusted with the structure of the antenna element as described above. It should be noted that the examination test will be described later in detail. Further, according to the embodiment of the present invention, it is possible to provide an antenna element having the structure suitable for a reduction in thickness as in the antenna element shown in FIG. 17.

As described above, according to the embodiments of the present invention, in the antenna element capable of being adapted to the plurality of frequency bands and in the communication apparatus provided therewith, it is possible to realize the reduction in height of the antenna element, independently adjust the characteristics in the frequency bands, and obtain the characteristics excellent in the plurality of frequency bands.

These and other objects, features and advantages of the present invention will become more apparent in light of the following detailed description of best mode embodiments thereof, as illustrated in the accompanying drawings.

BRIEF DESCRIPTION OF DRAWINGS

FIG. 3 is a frequency characteristic diagram of the antenna element according to the first embodiment;

DESCRIPTION OF PREFERRED EMBODIMENTS

Hereinafter, a structural example of an antenna element and a communication apparatus provided with the antenna element according to embodiments of the present invention will be described with reference to the drawings in the following order. It should be noted that the present invention is not limited to the following example.

Figure 1:
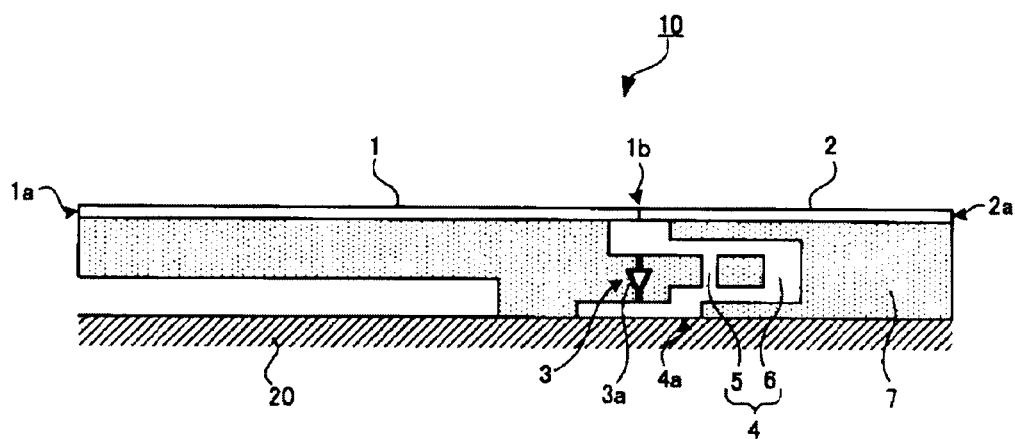
FIG. 1 is a schematic cross-sectional view of an antenna element according to a first embodiment.

1. First embodiment: Basic structural example of antenna element
2. Second embodiment: Structural example of communication apparatus provided with antenna element according to present invention 1. First Embodiment Antenna Element FIG. 1 shows the schematic structure of an antenna element according to a first embodiment of the present invention. It should be noted that FIG. 1 is a schematic cross-sectional view of the antenna element. Further, in this embodiment, a description will be given on an antenna element in which two inverted-F antennas are integrally configured, and which is adapted to two different resonant frequency bands.

An antenna element 10 is provided with a dielectric unit 7, a low-frequency band antenna main body unit 1, a high-frequency band antenna main body unit 2, a feeding unit 3, and a short-circuit unit 4. The dielectric unit 7 is formed on a substrate 20 on which the antenna element 10 is mounted. The low-frequency band antenna main body unit 1 and the high-frequency band antenna main body unit 2 are formed on the dielectric unit 7. The feeding unit 3 and the short-circuit unit 4 are formed in the dielectric unit 7.

The low-frequency band antenna main body unit 1 (first antenna main body unit) is a main body part of an antenna element that contributes to transmission and reception of a radio signal in a low-frequency band (first frequency band). The high-frequency band antenna main body unit 2 (second antenna main body unit) is a main body part of an antenna element that contributes to transmission and reception of a radio signal in a high-frequency band (second frequency band). Therefore, an extended length of the low-frequency band antenna main body unit 1 is set to be longer than that of the high-frequency band antenna main body unit 2.

The low-frequency band antenna main body unit 1 and the high-frequency band antenna main body unit 2 each are formed of a line path made of a conductive material. In addition, in this embodiment, the low-frequency band antenna main body unit 1 and the high-frequency band antenna main body unit 2 are integrally formed on the dielectric unit 7. Specifically, one end of the low-frequency band antenna main body unit 1 in the extended direction is connected with one end of the high-frequency band antenna main body unit 2 in the extended direction. It should be noted that the other end 1a (terminated end) of the low-frequency band antenna main body unit 1 and the other end 2a (terminated end) of the high-frequency band antenna main body unit 2 are open ends.

The feeding unit 3 (feeding path unit) and the short-circuit unit 4 are provided in parallel to each other between a branch point 1b (connection point) of the low-frequency band antenna main body unit 1 and the high-frequency band antenna main body unit 2 and a ground point 4a on the substrate 20. Further, the short-circuit unit 4 is constituted of a first short-circuit unit 5 (first short-circuit path unit) and a second short-circuit unit 6 (second short-circuit path unit). It should be noted that, in this example, an example in which the path length of the second short-circuit unit 6 is longer than that of the first short-circuit unit 5 is given as shown in FIG. 1.

The second short-circuit unit 6 is formed by being extended from the branch point 1b of the low-frequency band antenna main body unit 1 and the high-frequency band antenna main body unit 2 toward the open end 2a of the high-frequency band antenna main body unit 2, and then being folded at a point distanced from the feeding unit 3 by a predetermined distance and extended to the ground point 4a.

On the other hand, the first short-circuit unit 5 is configured, in the path of the second short-circuit unit 6, by a short-circuit path formed so as to short-circuit the path before and after the folded part. Specifically, the first short-circuit unit 5 is configured by a path from the low-frequency band antenna main body unit 1 and the high-frequency band antenna main body unit 2 to the ground point 4a via a short-circuit path formed on the way of the second short-circuit unit 6.

It should be noted that the low-frequency band antenna main body unit 1, the high-frequency band antenna main body unit 2, the short-circuit unit 4, and the dielectric unit 7 are capable of being made of the same material as that used for an antenna element in related art.

(Characteristics of Antenna Element)

Next, a description will be given on an evaluation test for various frequency characteristics that was conducted with respect to the antenna element 10 of this embodiment by an inventor of the present invention.

First, a change in frequency characteristic at a time when the path length of the second short-circuit unit 6 was checked with the path length of the first short-circuit unit 5 in the antenna element 10 being set to be constant.

Figure 2A:
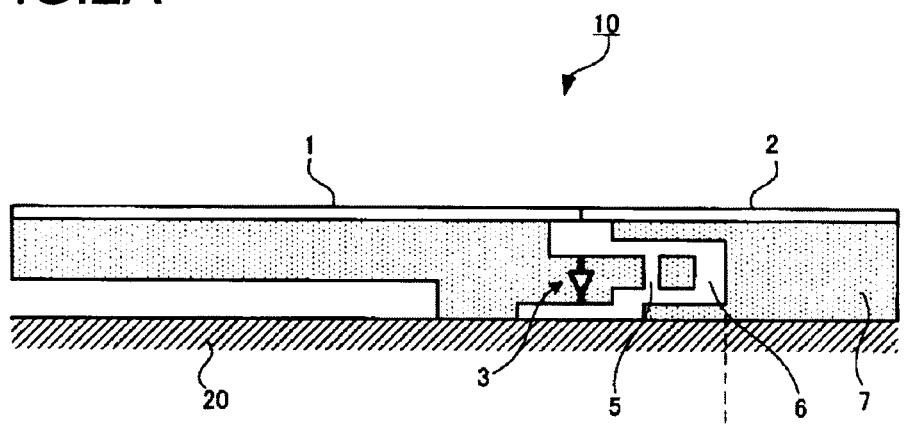
FIG. 2 are diagrams showing the outline of the evaluation test of the antenna element according to the first embodiment.
Figure 2B:
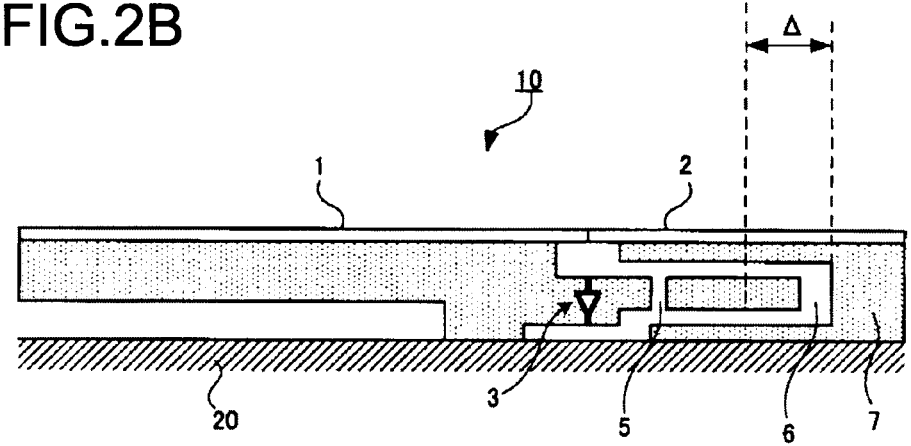

The outline of the evaluation test is shown in FIGS. 2A and 2B. It should be noted that FIG. 2A is a structural diagram of the antenna element 10 before the path length of the second short-circuit unit 6 is changed, and FIG. 2B is a structural diagram of the antenna element 10 in the case where the path length of the second short-circuit unit 6 is increased. Here, the change in frequency characteristic was checked in the case where amounts of change Δ in positions of the folded part of the second short-circuit unit 6 shown in FIG. 2A and the folded part thereof shown in FIG. 2B are variously changed within the range of 1 mm to 10 mm.

FIG. 3 shows a result of the aforementioned evaluation test. For simplification of the explanation, in FIG. 3, the frequency characteristics in the case where the amounts of change Δ in position of the folded part of the second short-circuit unit 6 are set to 2 mm, 6 mm, and 10 mm. Characteristic 50 (solid line), 51 (dashed and dotted line), and 52 (broken line) shown in FIG. 3 correspond to the frequency characteristics in the case where the amounts of change Δ in position are set to 2 mm, 6 mm, and 10 mm, respectively. Further, the horizontal axis of a graph of FIG. 3 indicates a frequency and a vertical axis thereof indicates an absolute value of an S parameter (S11) that represents a reflection amount of a signal at the feeding point 3a.

As is apparent from FIG. 3, if the distance between the folded part of the second short-circuit unit 6 and the feeding unit 3 in this embodiment (if the amounts of change Δ is increased), the frequency characteristic in the high-frequency band is improved (|S11| is reduced), and the bandwidth at |S11|=−10 dB is increased. On the other hand, the frequency characteristic in the low-frequency band is hardly changed, even if the distance between the folded part of the second short-circuit unit 6 and the feeding unit 3 is changed. Thus, in the antenna element 10 of this embodiment, the short-circuit path of the second short-circuit unit 6 contributes to a resonance (response) to a signal in the high-frequency band and hardly contributes to a resonance to a signal in the low-frequency band.

It should be noted that, although not shown, the inventor of the present invention also examined the change in frequency characteristic in the case where the path length of the first short-circuit unit 5 is changed with the path length of the second short-circuit unit 6 being set to be constant. As a result, in this case, the frequency characteristic in the high-frequency band changed little, and only the frequency characteristic in the low-frequency band changed. Thus, it was found that in the antenna element 10 in this embodiment, the short-circuit path of the first short-circuit unit 5 mainly contributes to the resonance to the signal in the low-frequency band and hardly contributes to the resonance to the signal in the high-frequency band.

Figure 17:
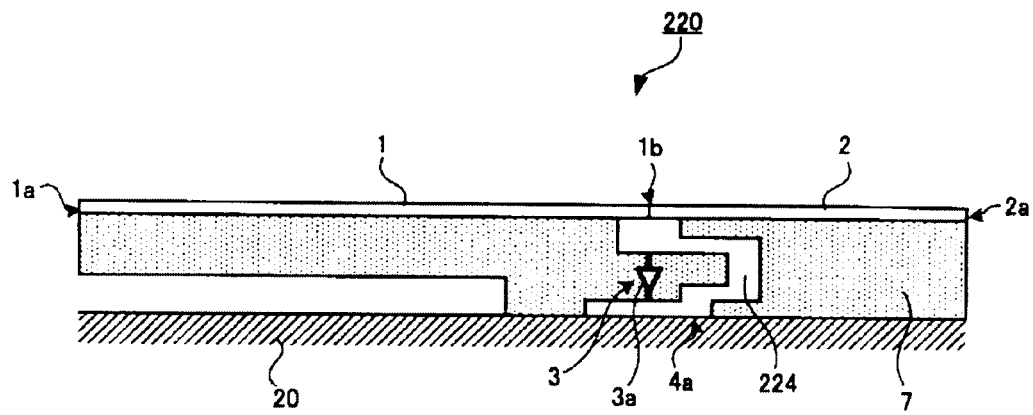
FIG. 17 is a schematic cross-sectional view showing an antenna element in related art (comparative example 1)
Figure 18:
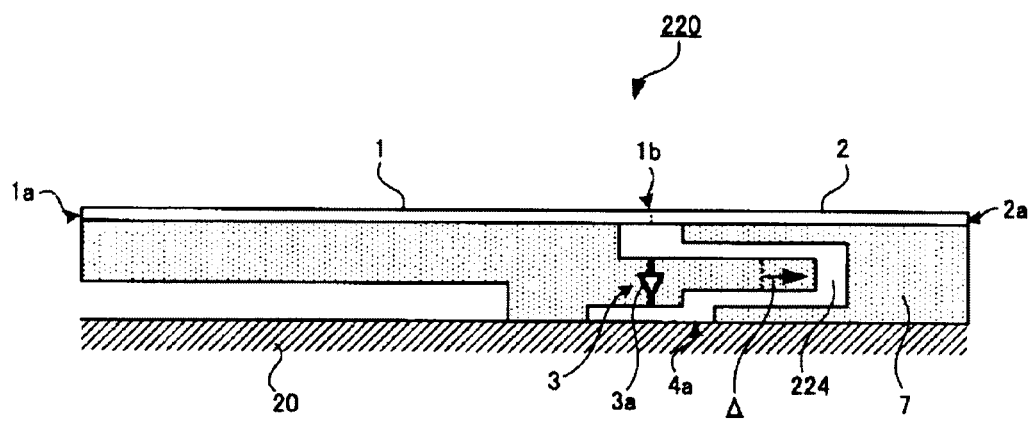
FIG. 18 is a diagram showing the outline of an adjustment method for a frequency characteristic in the antenna element in related art (comparative example 1)
Figure 19:
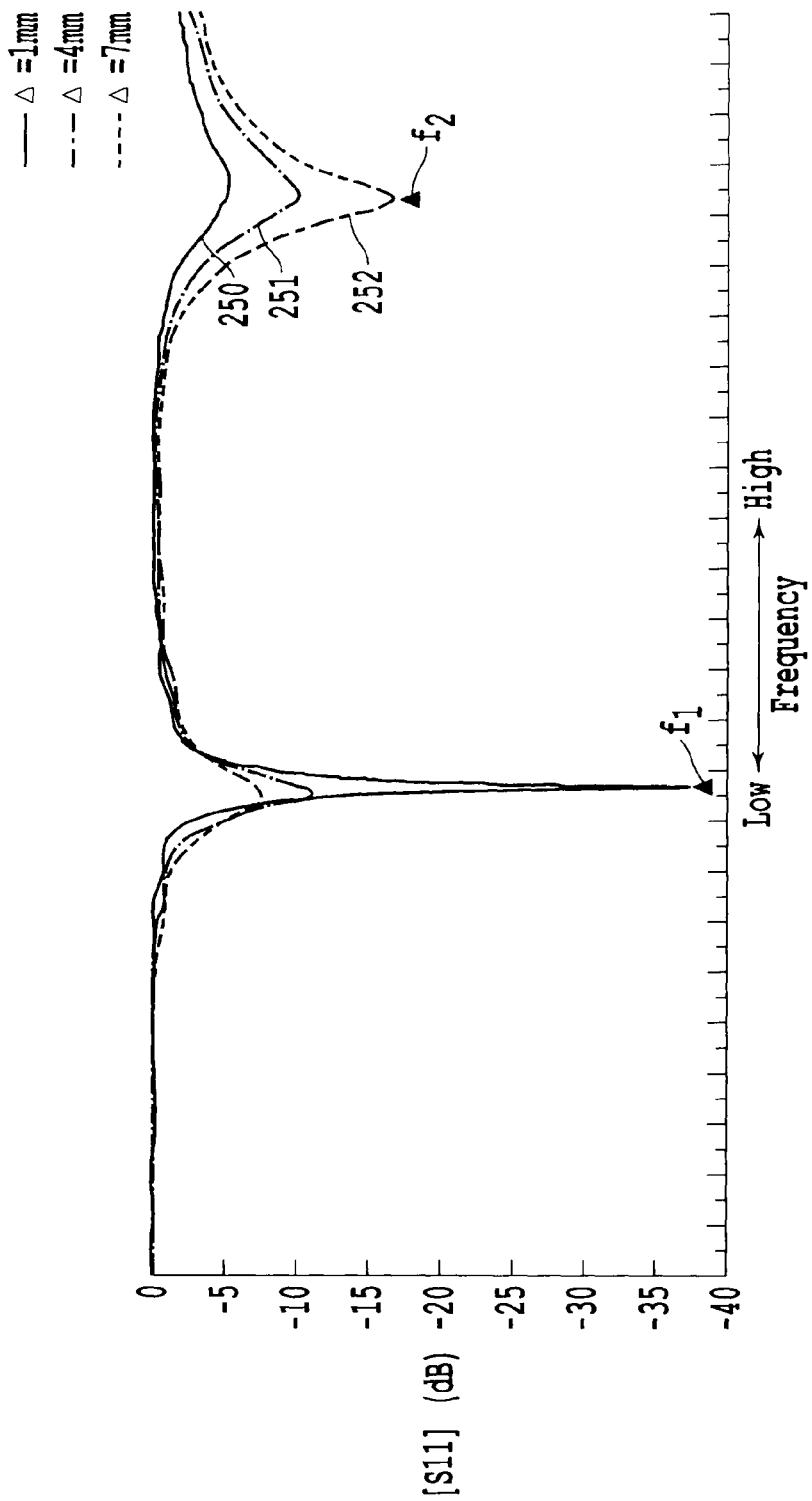
FIG. 19 is a frequency characteristic diagram of the antenna element in related art (comparative example 1).

Further, the inventor of the present invention examined the changes in center frequency $f_1$ and minimum value of |S11| in the low-frequency band in the case where the amount of change Δ in distance between the folded part of the second short-circuit unit 6 and the feeding unit 3 is changed within the range of 1 mm to 10 mm. In the characteristic evaluation, the antenna element 220 described with reference to FIG. 17 was also subjected to the same evaluation for comparison. It should be noted that, for the antenna element 220 in related art (comparative example 1), a distance between the folded part of a short-circuit unit 224 and the feeding unit 3 is increased with an optimal state of the frequency characteristic in the low-frequency band being set as a reference (amount of change Δ=0). This evaluation result is shown in FIGS. 4 and 5.

Figure 4:
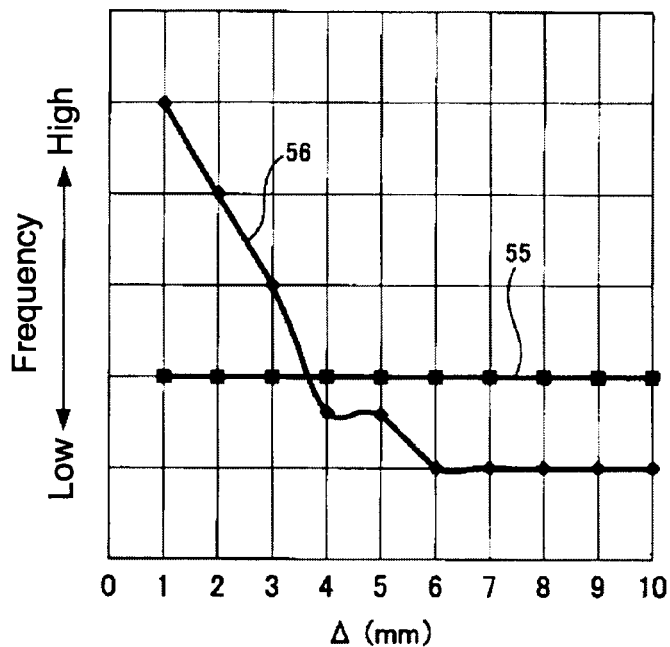
FIG. 4 is a diagram showing a relationship between a center frequency in a low frequency band of the antenna element according to the first embodiment and a layout of a second short-circuit unit thereof.

A characteristic shown in FIG. 4 is a change characteristic of the center frequency $f_1$ in the low-frequency band with respect to the amount of change Δ in distance between the feeding unit 3 and the folded part of the second short-circuit unit 6 (short-circuit unit 224). It should be noted that a characteristic 55 shown in FIG. 4 represents the characteristic of the antenna element 10 of this embodiment, and a characteristic 56 represents the characteristic of the antenna element 220 of the comparative example 1. Further, the horizontal axis of the graph of FIG. 4 indicates the amount of change Δ, and the vertical axis thereof indicates the center frequency $f_1$ in the low-frequency band.

Figure 5:
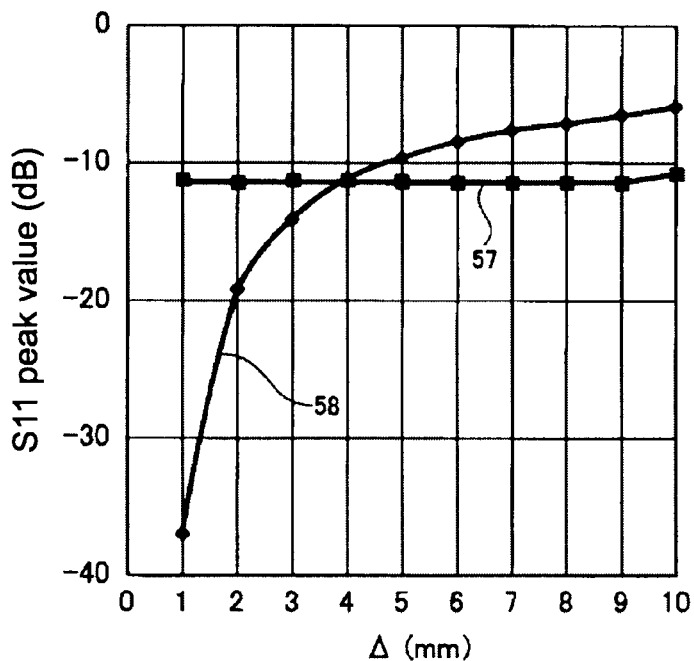
FIG. 5 is a diagram showing a relationship between a minimum value of |S11| in the low frequency band of the antenna element according to the first embodiment and the layout of the second short-circuit unit thereof.

Further, a characteristic shown in FIG. 5 represents a change characteristic of the minimum value of |S11| in the low-frequency band with respect to the amount of change Δ in distance between the feeding unit 3 and the folded part of the second short-circuit unit 6 (short-circuit unit 224). It should be noted that a characteristic 57 shown in FIG. 5 indicates the characteristic of the antenna element 10 of this embodiment, and a characteristic 58 indicates a characteristic of the antenna element 220 of the comparative example 1. Further, the horizontal axis of the graph of FIG. 5 indicates the amount of change Δ, and the vertical axis thereof indicates the minimum value of |S11| in the low-frequency band.

As is apparent from the results shown in FIGS. 4 and 5, if the distance between the feeding unit 3 and the folded part of the short-circuit unit 224 is changed, in the antenna element 220 of a comparative example 1, the minimum value of |S11| and the center frequency $f_1$ in the low-frequency band significantly change. In contrast, in the antenna element 10 of this embodiment, even if the distance between the feeding unit 3 and the folded part of the second short-circuit unit 6 is changed, the minimum value of |S11| and the center frequency $f_1$ in the low-frequency band hardly change. From those results, it was found that, in the antenna element 10 of this embodiment, the short-circuit path of the second short-circuit unit 6 hardly contributes to the resonance to the signal in the low-frequency band.

Further, for comparison, the inventor examined the frequency characteristic with respect to an antenna element in the case where the first short-circuit unit 5 or the second short-circuit unit 6 is removed in the antenna element 10 of this embodiment shown in FIG. 1.

Figure 6:
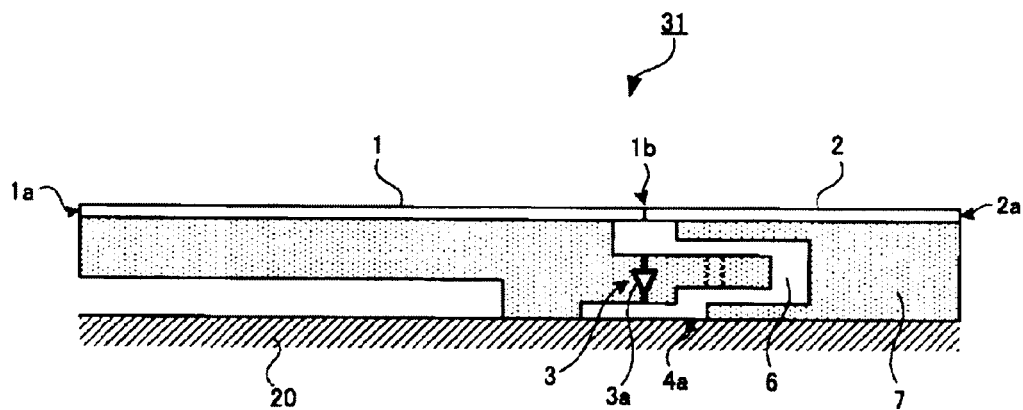
FIG. 6 is a schematic cross-sectional view showing an antenna element of a comparative example 2.

FIG. 6 shows the structure of a structural example (comparative example 2) of an antenna element in the case where the first short-circuit unit 5 (part surrounded by the broken lines of FIG. 6) is removed in the antenna element 10 of this embodiment. It should be noted that in an antenna element 31 of the comparative example 2 shown in FIG. 6, the same parts as those of the antenna element 10 of this embodiment shown in FIG. 1 are denoted by the same reference numerals and symbols. As is apparent from the comparison between FIG. 6 and FIG. 1, the antenna element 31 of the comparative example 2 has the same structure as the antenna element 10 of this embodiment except that the first short-circuit unit 5 is removed.

Figure 7:
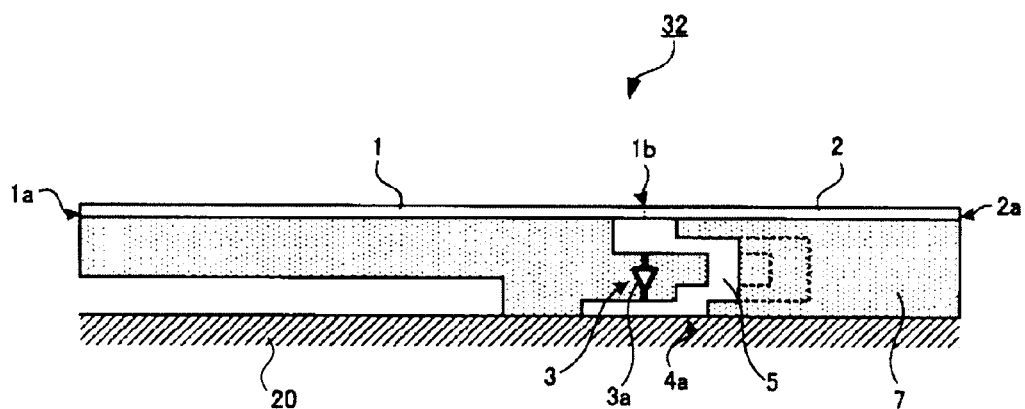
FIG. 7 is a schematic cross-sectional view showing an antenna element of a comparative example 3.

In addition, FIG. 7 shows the structure of a structural example (comparative example 3) of an antenna element in the case where the second short-circuit unit 6 (part surrounded by the broken lines of FIG. 7) is removed in the antenna element 10 of this embodiment. It should be noted that in an antenna element 32 of the comparative example 3 shown in FIG. 7, the same parts as those of the antenna element 10 of this embodiment shown in FIG. 1 are denoted by the same reference numerals and symbols. As is apparent from the comparison between FIG. 7 and FIG. 1, the antenna element 32 of the comparative example 3 has the same structure as the antenna element 10 of this embodiment except that the second short-circuit unit 6 is removed.

Figure 8:
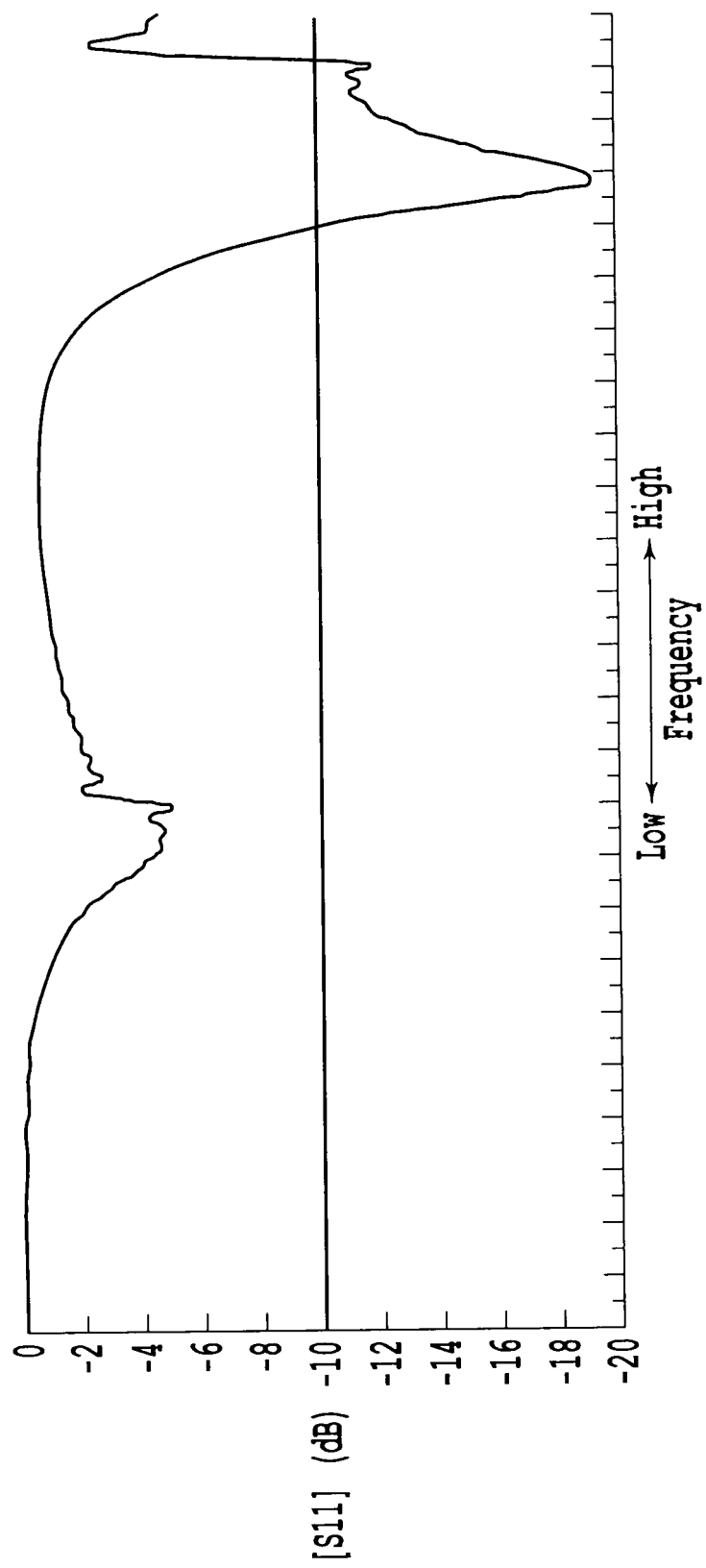
FIG. 8 is a frequency characteristic diagram of the antenna element of the comparative example 2.
Figure 9:
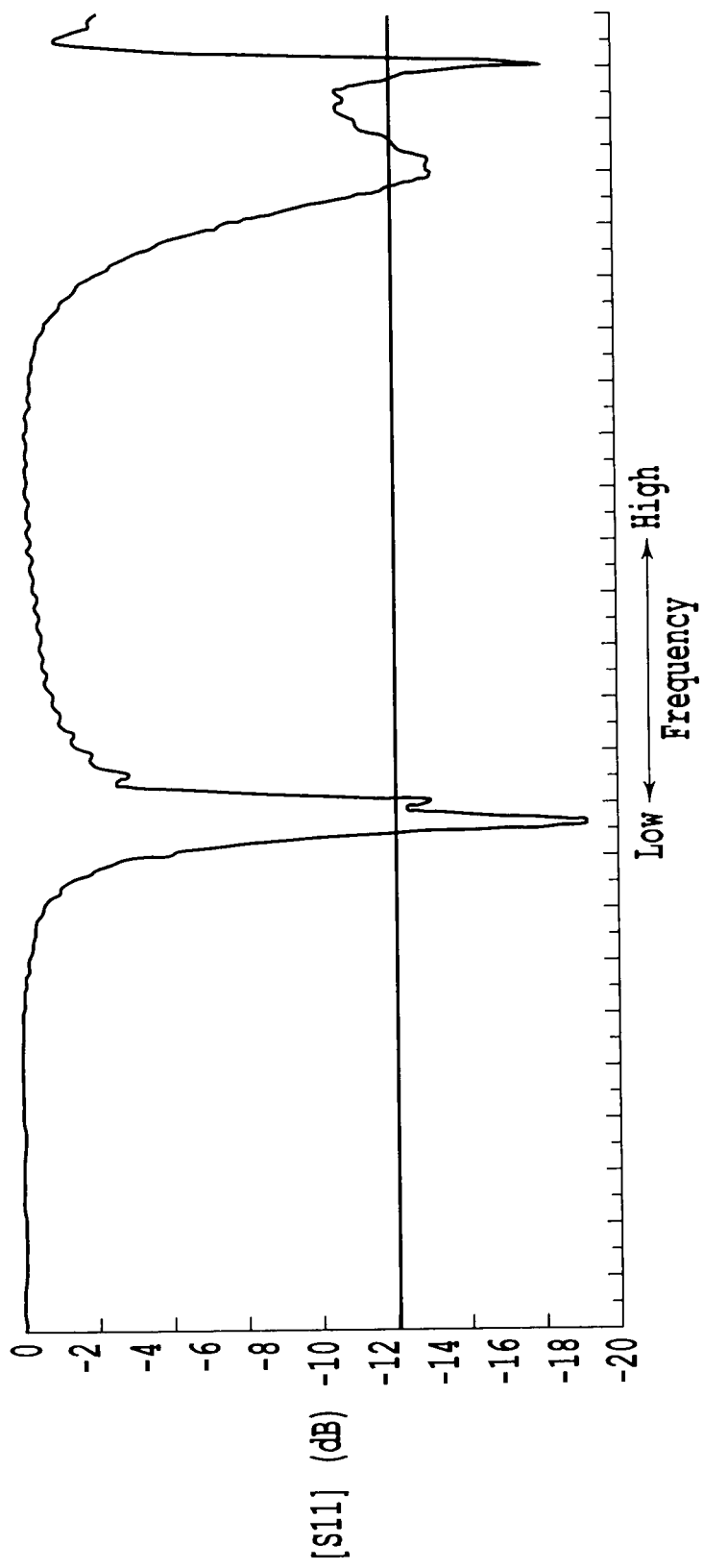
FIG. 9 is a frequency characteristic diagram of an antenna element of the comparative example 3.

FIGS. 8 and 9 show the frequency characteristic of each of the antenna element 31 of the comparative example 2 and the antenna element 32 of the comparative example 3, respectively. It should be noted that the horizontal axes of the graphs of FIGS. 8 and 9 each indicate the frequency, and the vertical axes thereof each indicate an absolute value of the S parameter (S11: return loss) that represents the reflection amount of a signal at the feeding point 3a.

As is apparent from FIG. 8, in the case where the first short-circuit unit 5 is removed in the antenna element 10 of this embodiment shown in FIG. 1, it is found that the frequency characteristic in the low frequency band is deteriorated. In addition, as is apparent from FIG. 9, in the case where the second short-circuit unit 6 is removed in the antenna element 10 of this embodiment shown in FIG. 1, it is found that the frequency characteristic in the high frequency band is deteriorated.

From the results shown in FIGS. 8 and 9, it is also found that the short-circuit path of the first short-circuit unit 5 mainly contributes to the resonance to the signal in the low frequency band, and the short-circuit path of the second short-circuit unit 6 mainly contributes to the resonance to the signal in the high frequency band in the antenna element 10 of this embodiment.

From the various evaluation results as described above, it is found that in the antenna element 10 of this embodiment, the path length of the first short-circuit unit 5 is adjusted, thereby making it possible to adjust the frequency characteristic in the low frequency band without changing the frequency characteristic in the high frequency band. Further, it is found that in the antenna element 10 of this embodiment, the path length of the second short-circuit unit 6 is adjusted, thereby making it possible to adjust the frequency characteristic in the high frequency band without changing the frequency characteristic in the low frequency band. That is, in the antenna element in which the two inverted-F antennas are integrated, by forming the two short-circuit paths in parallel as in this embodiment, it is possible to make an adjustment (impedance adjustment) of the frequency characteristics in the low frequency band and the high frequency band independently of each other.

(Design Method for Antenna Element)

Next, a description will be given in a design method for the antenna element 10 of this embodiment. As described above, the inventor of the present invention has revealed that in the antenna element 10, the first short-circuit unit 5 contributes to the resonance to the signal in the low frequency band, and the second short-circuit unit 6 contributes to the resonance to the signal in the high frequency band. That is, the inventor has revealed that, by adjusting the position of the folded part of the first short-circuit unit 5 with respect to the feeding unit 3, it is possible to adjust the frequency characteristic in the low frequency band, and by adjusting the position of the folded part of the second short-circuit unit 6, it is possible to adjust the frequency characteristic in the high frequency band. In this embodiment, the frequency characteristics in the low frequency band and in the high frequency band are individually optimized on the basis of the newly revealed phenomenon.

Here, the design method for the antenna element 10 (adjustment method for frequency characteristic) of this embodiment will be more specifically described with reference to FIGS. 10 and 11. It should be noted that FIG. 10 is a diagram showing a current path that contributes to the resonance to the signal in the low frequency band, and FIG. 11 is a diagram showing a current path that contributes to the resonance to the signal in the high frequency band.

Figure 10:
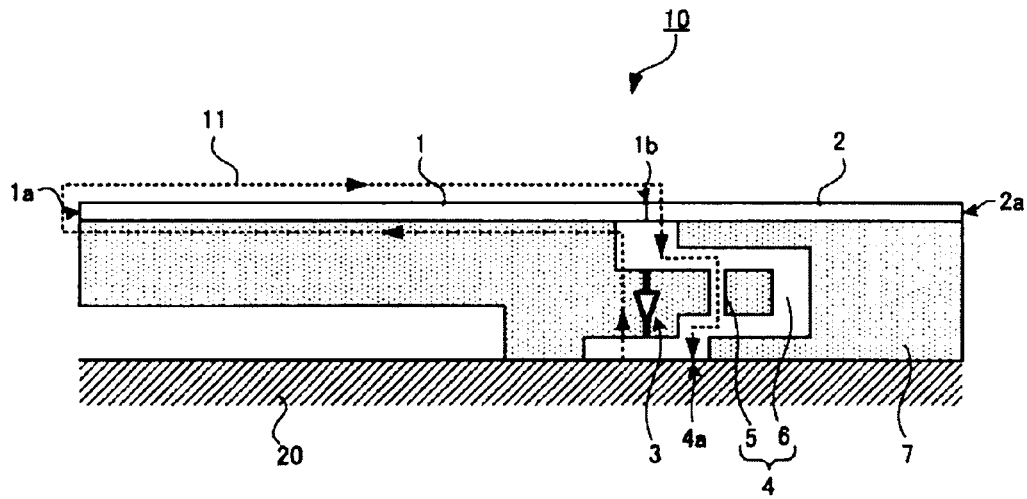
FIG. 10 is a diagram for explaining a design method for the antenna element according to the first embodiment.
Figure 11:
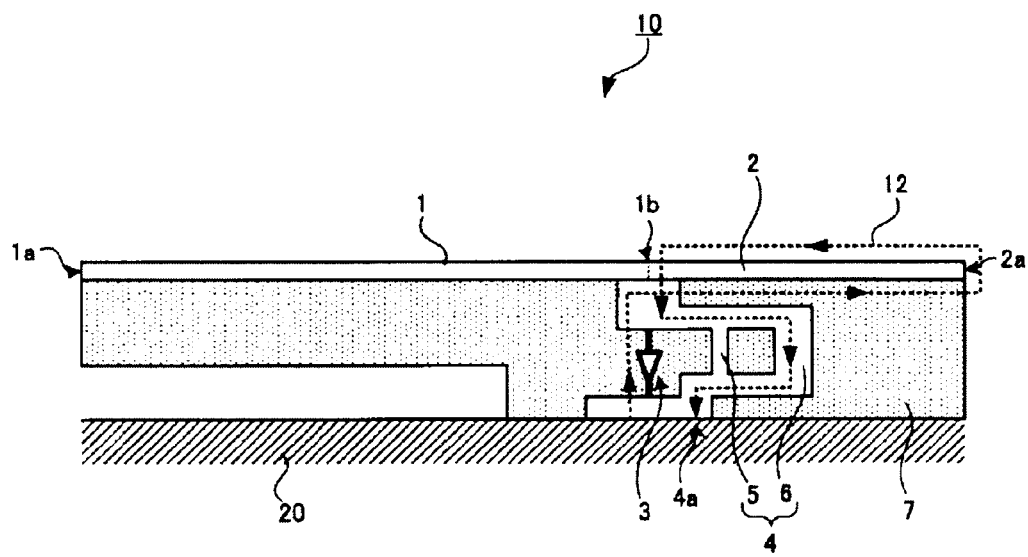
FIG. 11 is a diagram for explaining a design method for the antenna element according to the first embodiment.

As described above, in the antenna element 10 in this embodiment, since the first short-circuit unit 5 contributes to the resonance to the signal in the low frequency band, a current path 11 that contributes to the resonance to the signal in the low frequency band is a path indicated by the broken line of FIG. 10 in the antenna element 10. More specifically, first, a current which is output from the feeding unit 3 is caused to pass below the low-frequency band antenna main body unit 1 (on the dielectric unit 7 side) and turn back at an open end 1a. After that, the current passes above the low-frequency band antenna main body unit 1 (on the opposite side to the dielectric unit 7 side), passes the branch point 1b and the first short-circuit unit 5 in this order, and flows to the ground point 4a.

In the antenna element 10 of this embodiment, in principle, the length of the current path 11 described above is set to an integer multiple ($n \cdot \lambda_1/2$: n is a positive integer) of an approximately ½ length of a wavelength $\lambda_1$ of a center wavelength signal in the low frequency band, thereby making it possible to optimize the frequency characteristic in the low frequency band. That is, the sum of the path length of the feeding unit 3, twice the extended length of the low-frequency band antenna main body unit 1, and the path length of the first short-circuit unit 5 is set to the integer multiple of the approximately ½ wavelength of the center frequency signal in the low frequency band, with the result that the frequency characteristic in the low-frequency band can be optimized.

It should be noted that in the case where the extended length of the low-frequency band antenna main body unit 1 and the thickness of the dielectric unit 7 are set to be constant, by adjusting the length of the short-circuit path of the first short-circuit unit 5, it is possible to optimize the frequency characteristic in the low frequency band.

On the other hand, in the antenna element 10 of this embodiment, since the second short-circuit unit 6 contributes to the resonance to the signal in the high frequency band, a current path 12 that contributes to the resonance to the signal in the high frequency band is a path indicated by the broken line of FIG. 11 in the antenna element 10. More specifically, first, a current which is output from the feeding unit 3 is caused to pass below the high-frequency band antenna main body unit 2 (on the dielectric unit 7 side) and turn back at an open end 2a. After that, the current passes above the high-frequency band antenna main body unit 2 (on the opposite side to the dielectric unit 7 side), passes the branch point 1b and the second short-circuit unit 6 in this order, and flows to the ground point 4a.

In the antenna element 10 of this embodiment, in principle, the length of the current path 12 described above is set to an integer multiple ($n \cdot \Delta_2/2$) of an approximately ½ length of a wavelength $\lambda_2$ of a center wavelength signal in the high frequency band, thereby making it possible to optimize the frequency characteristic in the high frequency band. That is, the sum of the path length of the feeding unit 3, twice the extended length of the high-frequency band antenna main body unit 2, and the path length of the second short-circuit unit 6 is set to an integer multiple of the approximately ½ wavelength of the center frequency signal in the high frequency band, with the result that the frequency characteristic in the high-frequency band can be optimized.

It should be noted that in the case where the extended length of the high-frequency band antenna main body unit 2 and the thickness of the dielectric unit 7 are set to be constant, by adjusting the length of the short-circuit path of the second short-circuit unit 6, is possible to optimize the frequency characteristic in the high frequency band.

In the antenna element 10 of this embodiment shown in FIG. 1, since the lengths of the current paths 11 and 12 in the antenna element 10 are set to $\lambda_1/2$ and $\lambda_2$, respectively, the folded part of the second short-circuit unit 6 is disposed at a position far from the feeding unit 3 as compared to that of the first short-circuit unit 5. In the case where the lengths of the current paths 11 and 12 are set to $\lambda_1/2$ and $\lambda_2/2$, respectively, the folded part of the second short-circuit unit 6 is disposed at a position closer to the feeding unit 3 as compared to the first short-circuit unit 5. In other words, in the antenna element 10 shown in FIG. 1, the positional relationship between the folded part of the first short-circuit unit 5 and the folded part of the second short-circuit unit 6 with respect to the feeding unit 3 varies depending on the settings of the lengths of the current path 11 and the current path 12 in the antenna element 10.

In this embodiment, the lengths of the short-circuit paths in the antenna element 10 are set as described above, and the frequency characteristics (impedance characteristics) in the low frequency band and high frequency band in the antenna element 10 are adjusted. It should be noted that the dimension of each of the short-circuit units, such as the thickness and the width, is set as appropriate in accordance with a value or the like of the frequency band to be adapted to, for example.

As described above, in the antenna element 10 of this embodiment, it is possible to independently optimize (make the impedance adjustment) the frequency characteristics in the plurality of frequency bands, which are capable of being adapted to, without interfering with each other. Further, at this time, it is possible to adjust the frequency characteristics in the frequency bands by appropriately changing the positions of the folded part of the first short-circuit unit 5 and the folded part of the second short-circuit unit 6 with respect to the feeding unit 3. That is, in the antenna element 10 of this embodiment, it is possible to independently adjust the frequency characteristics in the respective frequency bands without changing the height thereof. Therefore, according to the antenna element 10 of this embodiment, it is possible to obtain the excellent frequency characteristics in the plurality of frequency bands capable of being adapted to, while realizing the reduction in height thereof.

In addition, in the antenna element 10 of this embodiment, since the open end (antenna main body unit) and the short-circuit unit for each frequency band, it is possible to more positively secure the adjustment of the frequency characteristics in the respective frequency bands.

Modified Example

Figure 12:
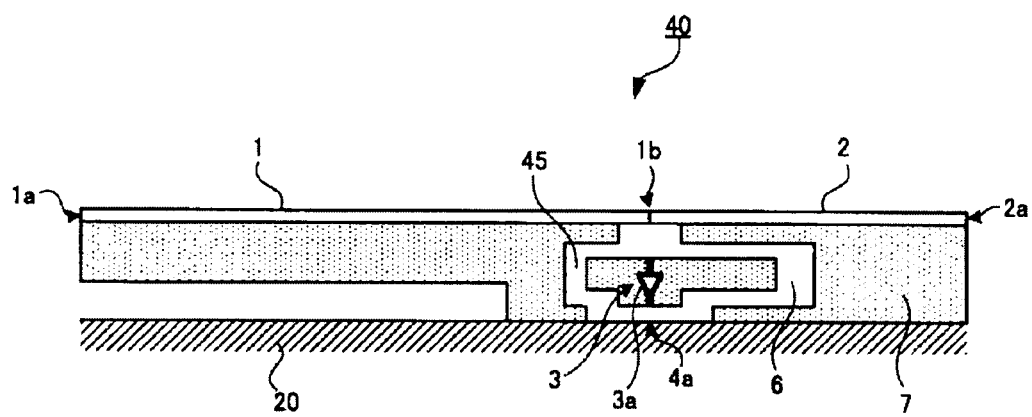
FIG. 12 is a schematic cross-sectional view showing an antenna element of a modified example.

In the above embodiment, the description is given on the example (see, FIG. 1) in which the first short-circuit unit 5 that contributes to the resonance to the signal in the low frequency band is provided on the open end 2a side of the high-frequency band antenna main body unit 2 with respect to the feeding unit 3, but the present invention is not limited to this example. For example, the first short-circuit unit that contributes to the resonance to the signal in the low frequency band may be provided on the open end 1a side of the low-frequency band antenna main body unit 1 with respect to the feeding unit 3. FIG. 12 shows a structural example (modified example) of the case. It should be noted that in an antenna element of the modified example shown in FIG. 12, the same parts as those of the antenna element 10 of the first embodiment are denoted by the same reference numerals or symbols.

As is apparent from the comparison between FIG. 12 and FIG. 1, an antenna element 40 of the modified example has the same structure as the antenna element 10 of the first embodiment except that a first short-circuit unit 45 is provided on the open end 1a side of the low-frequency band antenna main body unit 1 with respect to the feeding unit 3.

In the antenna element 40 of the modified example, a current path that contributes to the resonance to the signal in the low frequency band passes from the feeding unit 3 to the ground point 4a through a part below the low-frequency band antenna main body unit 1, the open end 1a, a part above the low-frequency band antenna main body unit 1, the branch point 1b, and the first short-circuit unit 45, in the stated order. Therefore, in principle, the length of the current path is set to an integer multiple ($n \cdot \lambda_1/2$) of an approximately ½ of the wavelength $\lambda_1$ of a center wavelength signal in the low frequency band, thereby making it possible to optimize the frequency characteristic in the low frequency band.

It should be noted that in the antenna element 40 of the modified example, the current path that contributes to the resonance to the signal in the high frequency band is the same as that of the first embodiment, so the frequency characteristic in the high frequency band can be optimized as in the first embodiment.

Further, in each of the first embodiment and the modified example, the description is given on the antenna element capable of being adapted to the two frequency bands. However, the present invention is not limited to those and is also applicable to an antenna element capable of being adapted to three or more frequency bands.

In the antenna element capable of being adapted to three or more frequency bands, the same effect is also obtained by providing a short-circuit unit having a predetermined path length for each frequency band.

2. Second Embodiment

Next, a description will be given on a structural example of a communication apparatus that is provided with the antenna element according to the above embodiment of the present invention. It should be noted that in a second embodiment, a personal computer (hereinafter, referred to as computer apparatus) having a communication function is given as an example of the communication apparatus.

Figure 13:
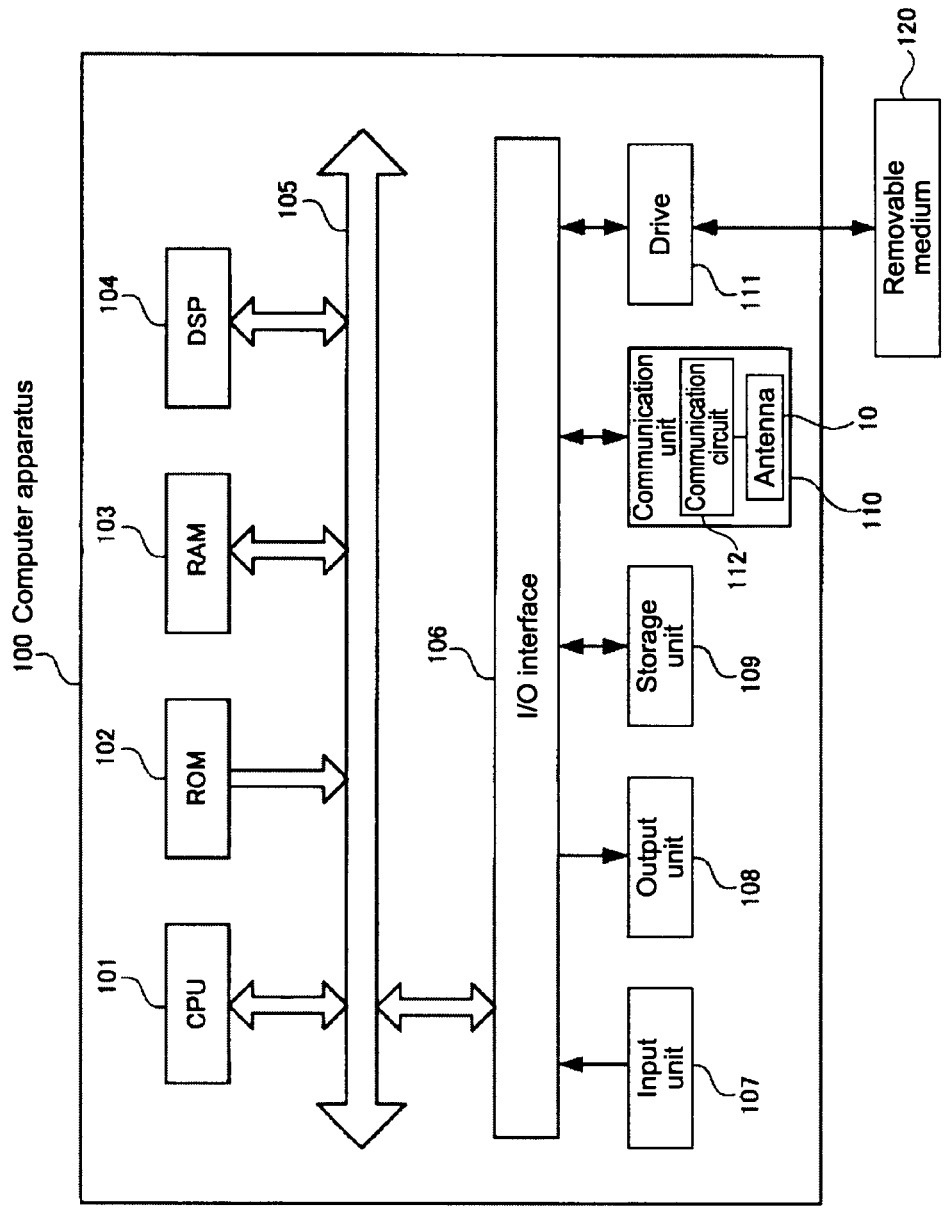
FIG. 13 is a block structural diagram showing a computer apparatus according to a second embodiment.

FIG. 13 shows the structure of the computer apparatus according to the second embodiment. It should be noted that FIG. 13 is a schematic block structural diagram of the computer apparatus.

A computer apparatus 100 is provided with a CPU (central processing unit) 101, a ROM (read only memory) 102, a RAM (random access memory) 103, a DSP (digital signal processor) 104, and a bus 105. The CPU 101, the ROM 102, the RAM 103, and the DSP 104 are connected with each other via the bus 105.

The computer apparatus 100 is further provided with an input and output interface 106, an input unit 107, an output unit 108, a storage unit 109, a communication unit 110, and a drive 111. Further, the input and output interface 106 is connected to the bus 105, and the input unit 107, the output unit 108, the storage unit 109, the communication unit 110, and the drive 111 are connected to the input and output interface 106.

The CPU 101 executes various processings in accordance with programs stored in the ROM 102 or the storage unit 109. The RAM 103 stores, as needed, programs or data necessary for the execution of the various processings by the CPU 101. Further, the DSP 104 performs a predetermined digital signal processing with respect to a signal of an image or the like.

The input unit 107 is configured by a reception unit or the like for receiving an instruction signal transmitted from a keyboard, a mouse, a microphone, a remote controller, or the like. The output unit 108 is configured by a display, a speaker, or the like. The storage unit 109 is configured by a hard disk, a nonvolatile memory, or the like. It should be noted that, in the storage unit 109, various pieces of data and programs are stored.

The communication unit 110 is constituted of the antenna element 10, a communication circuit 112, and the like, necessary for wireless communication with the outside. The antenna element 10 is the antenna element described in the first embodiment. Further, the communication circuit 112 modulates and demodulates a radio signal that is transmitted and received with the antenna element 10.

The drive 111 drives a removable medium 120. When the removable medium 120 such as a magnetic disk, an optical disk, a magneto-optical disk, and a semiconductor memory is loaded to the drive 111 as appropriate, a program read from the medium is installed into the storage unit 109 as necessary.

In the computer apparatus 100 with the aforementioned structure, the CPU 101 executes the program stored in the ROM 102 or the storage unit 109 by reading the program into the RAM 103 through the bus 105 and/or the input and output interface 106, thereby performing a predetermined processing.

Figure 14:
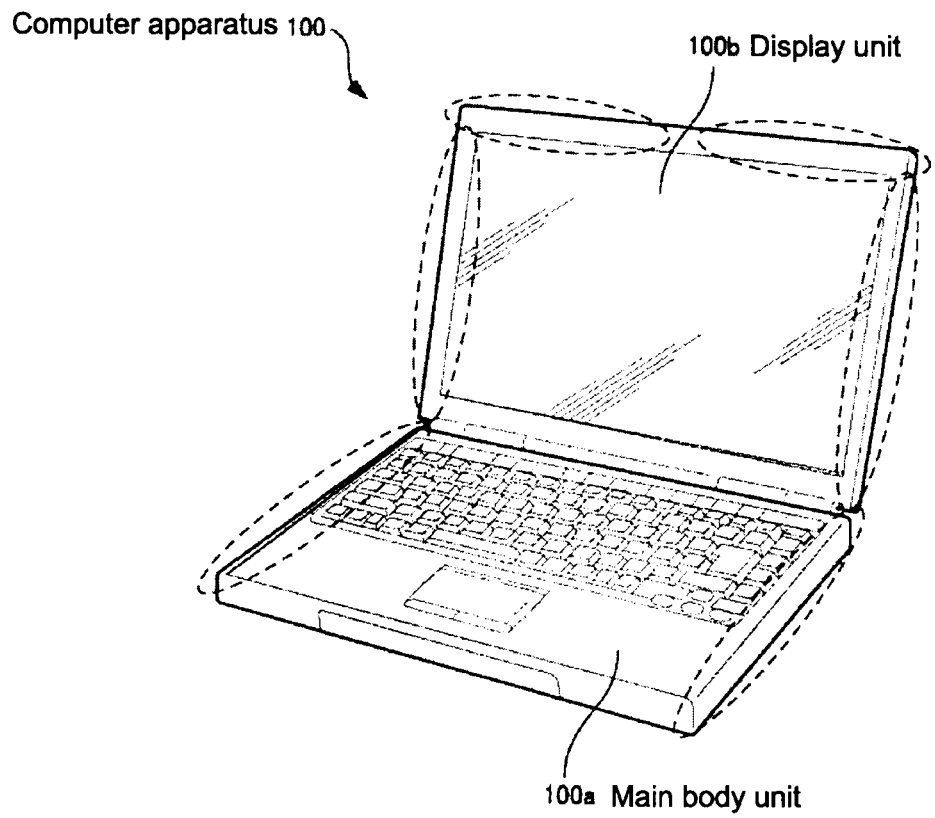
FIG. 14 is a diagram showing a layout of the antenna element in the computer apparatus according to the second embodiment.
Figure 15:
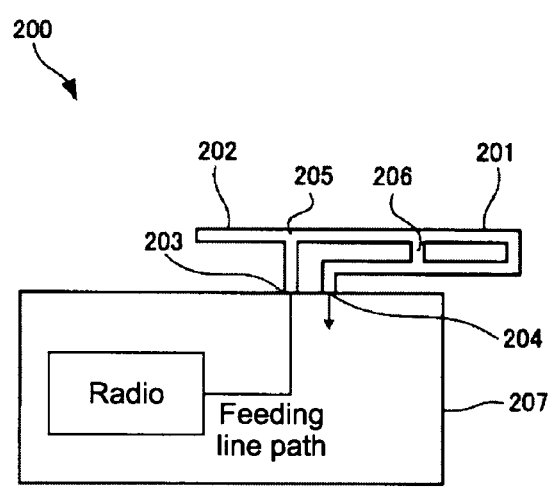
FIG. 15 is a schematic cross-sectional view showing an antenna element in related art.
Figure 16:
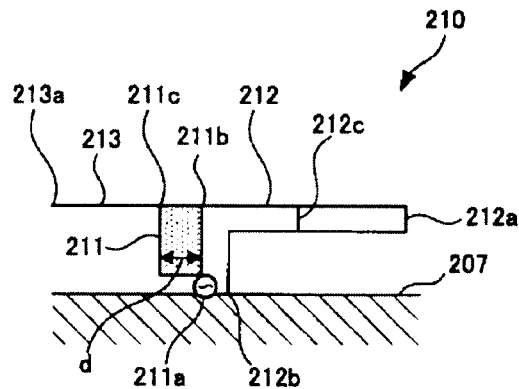
FIG. 16 is a schematic cross-sectional view showing an antenna element in related art.

Further, FIG. 14 shows a mounted position of the antenna element 10 in the computer apparatus 100 of this embodiment. FIG. 14 is an outside view of the computer apparatus 100 of this embodiment, and areas surrounded by the broken lines of FIG. 14 are positions where the antenna element 10 is capable of being mounted. In this embodiment, as shown in FIG. 14, the antenna element 10 is mounted in a casing in the vicinity of a side surface of a main body unit 100a of the computer apparatus 100 or in the casing in the vicinity of an outer frame of a display unit 100b thereof.

In the computer apparatus 100 of this embodiment, the antenna element 10 of the first embodiment is mounted, so it is possible to further reduce the size of the apparatus and obtain the excellent frequency characteristics with respect to the plurality of resonant frequency bands.

In the second embodiment, the computer apparatus is given as the example of the communication apparatus, but the present invention is not limited to the example. The present invention is applicable to any communication apparatus, as long as the apparatus has a wireless communication function, and the same effect is obtained. For example, the antenna element according to this embodiment is applicable to a communication terminal apparatus such as a mobile communication terminal in the same way as above, and the same effect is obtained.

The present application contains subject matter related to that disclosed in Japanese Priority Patent Application JP 2010-023421 filed in the Japan Patent Office on Feb. 4, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An antenna element, comprising:
   a feeding path unit connected to a feeding point;
   a first antenna main body unit having a first end connected to the feeding path unit and a second end, the second end being an open end;
   a second antenna main body unit having a first end connected to a connection point between the feeding path unit and the first antenna main body unit and a second end, the second end being an open end;
   a first short-circuit path unit to contribute to a resonance of a radio signal in a predetermined first frequency band, the first short-circuit path unit being between the connection point and a ground point; and
   a second short-circuit path unit to contribute to a resonance of a radio signal in a second frequency band higher than the first frequency band, the second short-circuit path unit being between the connection point and the ground point and having a path length different from a path length of the first short-circuit path unit,
   wherein the feeding path unit and the first and second short-circuit path units are in parallel between the connection point and the ground point.

2. The antenna element according to claim 1, wherein the path length of the first short-circuit path unit is shorter than the path length of the second short-circuit path unit.

3. The antenna element according to claim 1,
   wherein a sum of a path length of the feeding path unit, twice a length of the first antenna main body unit, and the path length of the first short-circuit path unit is an integer multiple of a ½ wavelength of the radio signal at a center frequency in the first frequency band, and
   wherein a sum of the path length of the feeding path unit, twice a length of the second antenna main body unit, and the path length of the second short-circuit path unit is an integer multiple of a ½ wavelength of the radio signal at a center frequency in the second frequency band.

4. The antenna element according to claim 1, further comprising a dielectric unit, on one surface of which the first antenna main body unit and the second antenna main body unit are formed.

5. A communication apparatus, comprising:
   an antenna element including:
      a feeding path unit connected to a feeding point,
      a first antenna main body unit having a first end connected to the feeding path unit and a second end, the second end being an open end,
      a second antenna main body unit having a first end connected to a connection point between the feeding path unit and the first antenna main body unit and a second end, the second end being an open end,
      a first short-circuit path unit to contribute to a resonance of a radio signal in a predetermined first frequency band, the first short-circuit path unit being between the connection point and a ground point, and
      a second short-circuit path unit to contribute to a resonance of a radio signal in a second frequency band higher than the first frequency band, the second short-circuit path unit being between the connection point and the ground point and having a path length different from a path length of the first short-circuit path unit; and
   a communication circuit to modulate and demodulate each of the radio signals that is transmitted and received with the antenna element,
   wherein the feeding path unit and the first and second short-circuit path units are in parallel between the connection point and the ground point.

6. The antenna element according to claim 1, wherein the first short-circuit path unit is in parallel with the second short-circuit path.

7. The antenna element according to claim 1, wherein the first and second antenna main body units are formed in a straight line path, and a length of the first antenna main body unit is greater than a length of the second antenna main body unit.

8. The antenna element according to claim 1, wherein the first short-circuit path unit and the second short-circuit path unit are arranged under the second antenna main body unit.

9. The antenna element according to claim 1, wherein the second short-circuit path unit includes a folded portion that folds in a thickness direction of the antenna element.

10. The antenna element according to claim 1, wherein the second ends of the first and second antenna main body units are oriented to face in opposite directions away from each other.

11. The antenna element according to claim 1, wherein the first short-circuit path unit is arranged before and after a folded portion of the second short-circuit path unit.

12. The antenna element according to claim 5, wherein a length of the first antenna main body unit is greater than a length of the second antenna main body unit.

13. The antenna element according to claim 5, wherein the first and second antenna main body units are formed in a straight line path.

14. The antenna element according to claim 5, wherein the first short-circuit path unit and the second short-circuit path unit are connected in parallel and are arranged under the second antenna main body unit.

15. The antenna element according to claim 5, wherein the second short-circuit path unit includes a folded portion that folds in a thickness direction of a dielectric portion upon which the first and second antenna main body units are formed and in which the first and second short-circuit path units are formed.

16. The antenna element according to claim 5, wherein the second ends of the first and second antenna main body units face in opposite directions.

17. The antenna element according to claim 5, wherein the first short-circuit path unit is arranged before and after a folded portion of the second short-circuit path unit.

* * * * *